United States Patent [19]

Girard

[11] Patent Number: 5,734,525
[45] Date of Patent: Mar. 31, 1998

[54] HEAD SUSPENSION WITH TORSION SPRING REGION

[75] Inventor: Mark Girard, Hutchinson, Minn.

[73] Assignee: Hutchinson Technology Incorporated, Hutchinson, Minn.

[21] Appl. No.: 754,207

[22] Filed: Nov. 20, 1996

[51] Int. Cl.$^6$ ...................................... G11B 5/48
[52] U.S. Cl. ............................................. 360/104
[58] Field of Search ................................. 360/104

[56] References Cited

U.S. PATENT DOCUMENTS

| | | | |
|---|---|---|---|
| 4,949,194 | 8/1990 | MacPherson et al. | 360/104 |
| 5,126,904 | 6/1992 | Sakurai | 360/104 |
| 5,353,181 | 10/1994 | Frater et al. | 360/104 |
| 5,408,372 | 4/1995 | Karam, II | 360/104 |
| 5,461,525 | 10/1995 | Christianson et al. | 360/104 |
| 5,526,205 | 6/1996 | Akihiko et al. | 360/104 |

*Primary Examiner*—John H. Wolff
*Attorney, Agent, or Firm*—Faegre & Benson

[57] ABSTRACT

A head suspension for use in a rigid disk drive is provided having a diminished spring constant for minimizing the negative effects of load loss on head suspension performance without a diminished sway mode resonant frequency. The head suspension includes a load beam having an actuator mounting region, a rigid region, a flexure, and a spring region between the actuator mounting region and the rigid region. The spring region contains at least one torsion arm a component of which extends in a direction transverse to the length of the load beam. A displacement normal to the plane of the load beam of the head slider causes a twisting action in the torsion arm. This twisting action generates a force which opposes the normal displacement of the head slider. Preferably, the head suspension also includes a plurality of partial thickness tabs positioned in the spring region which are rigid in the plane of the load beam such that a force exerted at the head slider in the plane of the load beam is opposed by the rigidity of the partial thickness tabs. Thus, the tabs act to retain lateral rigidity of the load beam thereby maintaining a high sway mode resonant frequency.

13 Claims, 8 Drawing Sheets

HEAD SUSPENSION WITH TORSION SPRING REGION

TECHNICAL FIELD

The present invention is directed to a head suspension for supporting a head slider within a rigid disk drive or other similar dynamic drive. More specifically, the present invention is directed to a head suspension with a modified spring or radius region for improving load related characteristics, in particular, for reducing the spring rate of the suspension without adversely affecting resonance performance.

BACKGROUND OF THE INVENTION

Information storage devices typically include a head for reading and/or writing data onto a storage medium such as a magnetic disk within a rigid disk drive. An actuator mechanism is used to position the head at specific lateral locations or tracks on the magnetic disk. Both linear and rotary type actuators are well known in the art. Between the actuator and the head, a head suspension is required to support the head in proper orientation relative to the disk surface.

The head suspension carries the read/write head so that the head can "fly" over the surface of the rigid disk while the disk is spinning. The head is typically located on a head slider having an aerodynamic design so that the head slider flies on an air bearing generated by the spinning disk. The combination of the head slider and the head suspension is referred to as a head suspension assembly. The head suspension includes a load beam having a radius or spring section and a rigid section. A spring or gimballing connection is typically included between the head slider and the rigid section of the load beam so that the head slider can move in the pitch and roll directions of the head to accommodate fluctuations of the disk surface. Such a spring connection can be provided by a gimbal which can be either a separate component connected to the rigid region of the load beam or integrally manufactured at the end of the load beam.

Typically, the spring section of the load beam includes a preformed bend or radius. This radius provides the spring or load force and thus a desired load to the head slider for a predetermined offset height, the offset height being a measurement of the distance between the mounting height of the head suspension to the actuator and the head slider at "fly" height.

The spring force provided by the spring region obeys a simple Hooke's law relation. That is, the load force the spring region exerts on the head slider toward the disk is directly proportional to the distance the head slider has been deflected away from the disk by the force created by the air bearing; the greater the deflection, the greater the opposing force and the less the deflection the lower the opposing force. The constant of proportionality between the distance the head slider has been deflected and the load force is the spring constant of the load beam.

As this discussion makes clear, the fly height of the head slider above the disk is a balance of the lifting force and the opposing load force. Thus, the load force is one factor that directly determines the height at which the head moves over the disk. This height is critical to high speed, accurate storage and retrieval of data. Further, the industry is constantly pushing the upper limit of the density of information that can be stored on disk drives. The density of information which a head can write to or read from a disk is proportional to the height of the head over the disk. Thus, it is desirable to control the fly height of the head over the disk as precisely as possible while preventing contact between the head and the disk.

However, disk drive manufacturing processes can make fly height control difficult to realize. Handling of the head suspension after production may change the bend or radius thereby altering load force characteristics causing "load loss."

Likewise, production variations, including manufacturing tolerances within the disk drive manufacture and/or assembly, may affect head suspension performance. For example, the spacing between disks in multi-disk drives may be slightly varied. Normally, when not flying over the disk, the load beam with the head slider is "parked" either on the surface of the disk or on a head lift device at the side of the disk. However, if the head slider were not so "parked," it would extend below the level of the surface of the disk when not flying above the disk. If the disk spacing is varied, the distance the load beam must be displaced from this rest position below the disk to a position at the correct fly height above the disk will vary from disk to disk. As explained above, the load beam obeys a Hooke's law relation, thus, this variation in initial displacement leads to a variation in load force at the slider.

Because of the direct relation between load force and fly height, load loss or spacing variations can impact fly height. One way to minimize the problem is to effectively make the spring region of the load beam more pliable. As noted above, the constant of proportionality between the deflection of the head slider and the opposing load force exerted by the spring region of the load beam is the load beam's spring constant. It follows that the lower this spring constant, the less effect a change in deflection will have on load force. Thus, lowering the spring constant of the spring region of the load beam acts to minimize the effects of load loss or spacing variation on fly height.

The prior art reveals various methods of lowering the load beam spring constant. One method is to elongate the spring region, another is to thin the material from which the spring region is manufactured. A third way is to reduce the thickness of a narrow strip of the spring region thereby effectively creating a hinge about which the load beam may rotate in a direction normal to the load beam. An example of this last method can be found in copending application Ser. No. 08/659,902 filed Jun. 7, 1996 by Girard et al.

However, these methods of reducing the load beam spring rate often have other consequences. In addition to providing the aforementioned spring force, the load beam must also provide the rigid link between the disk drive actuator and the head slider/head assembly for precisely positioning the head relative to data tracks on the disk surface. Lowering the spring rate of the load beam using one of the methods enumerated above can affect the load beam's ability to provide such a rigid link.

Specifically, lowering spring rate as above can increased the head suspension's vulnerability to high vibration frequencies which can cause off-track error. This effect is particularly acute at resonance frequencies of the suspension assembly. Thus, it is important to design a suspension assembly so that either its resonance frequencies are higher than the frequencies experienced in the drive environment or the gain (movement of the suspension assembly at the head slider) at resonance frequencies is minimized.

Of most concern in the design of suspension assemblies are the resonance frequencies of the torsional modes and lateral bending (or sway) modes. These modes can result in lateral movement of the head slider at the end of the head suspension assembly and are dependent on cross-sectional properties along the length of the load beam. Torsional modes sometimes produce a mode shape in which the tip of the resonating suspension assembly moves in a circular fashion. However, since the head slider is maintained in a direction perpendicular to the plane of the disk surface by the stiffness of the applied spring force acting against the air bearing, only lateral motion of the rotation is seen at the head slider. The sway mode is primarily lateral motion.

Typically, there are two torsional mode resonant frequencies which occur below the first sway mode resonant frequency. Various techniques well known in the art are used to design head suspensions so that these first two torsion modes have a minimal effect on read/write performance.

The resonance frequency of the sway mode is normally designed to be higher than the frequencies that are experienced by the load beams in the disk drives within which they are used. However, the techniques described above which can be used to lower load beam spring rate can also reduce the lateral stiffness of the load beam. This has the effect of lowering the sway mode resonant frequency, in some cases to a point below the second torsional mode resonant frequency. If sway gain is high and if a sway resonant frequency is within frequencies that may be experienced in the disk drive, off track error could occur.

SUMMARY OF THE INVENTION

By the present invention, spring rates can be advantageously lowered in a way that does not negatively impact lateral bending modes. Accordingly, the present invention includes a head suspension with a reduced spring rate. As discussed above, this minimizes the effect that load loss and production variations have on the ultimate fly height of the head above the magnetic disk. This, in turn, facilitates accurate, rapid deposit and retrieval of densely packed information to and from magnetic disks.

In another aspect of the invention, the technique utilized by the present invention to minimize load beam spring force does not lower lateral stiffness of the load beam. Thus, the sway resonant frequencies can be maintained above frequencies normally found in disk drive mechanisms.

The aforementioned advantages are achieved by a load beam having an actuator mounting region at its proximal end for connection to an actuator and, distal to this, a rigid region for retaining stiffness of the load beam. Further distal from this rigid region is a flexure having a head slider bond pad to which a head slider is mounted and which allows the head slider to pitch and roll as it encounters imperfections on the disk. Between the actuator mounting region and the rigid region is a resilient spring region. At least one torsion arm, connected between a first point and a second point transversely spaced from the first point, is located in the spring region. A deflection of the head slider acts to twist the torsion arm or arms which then impart a force on the load beam in a direction opposite that of the deflection. The torsion arm or arms generate less force for a given deflection of the load beam than does a typical spring region made from a solid section of resilient material. Thus, the current design lowers the spring constant of the load beam.

The lateral stiffness of the current invention is maintained by the use of a plurality of partial thickness tabs, also located in the spring region, which are rigid in the plane of the load beam. When a force is exerted on the load beam in the plane of the load beam, a stress is placed on one or more of the partial thickness tabs. Because the tabs are substantially rigid in the plane of the load beam, the tabs resist the lateral force and allow the load beam to remain un-deformed in the lateral direction. However, the partial thickness tabs are more pliable than the torsion arm or arms to bending in a direction normal to the load beam. Thus, the partial thickness tabs do not act to significantly increase the spring constant of the load beam.

DETAILED DESCRIPTION OF THE PREFERRED EMBODIMENTS

Figure 1:
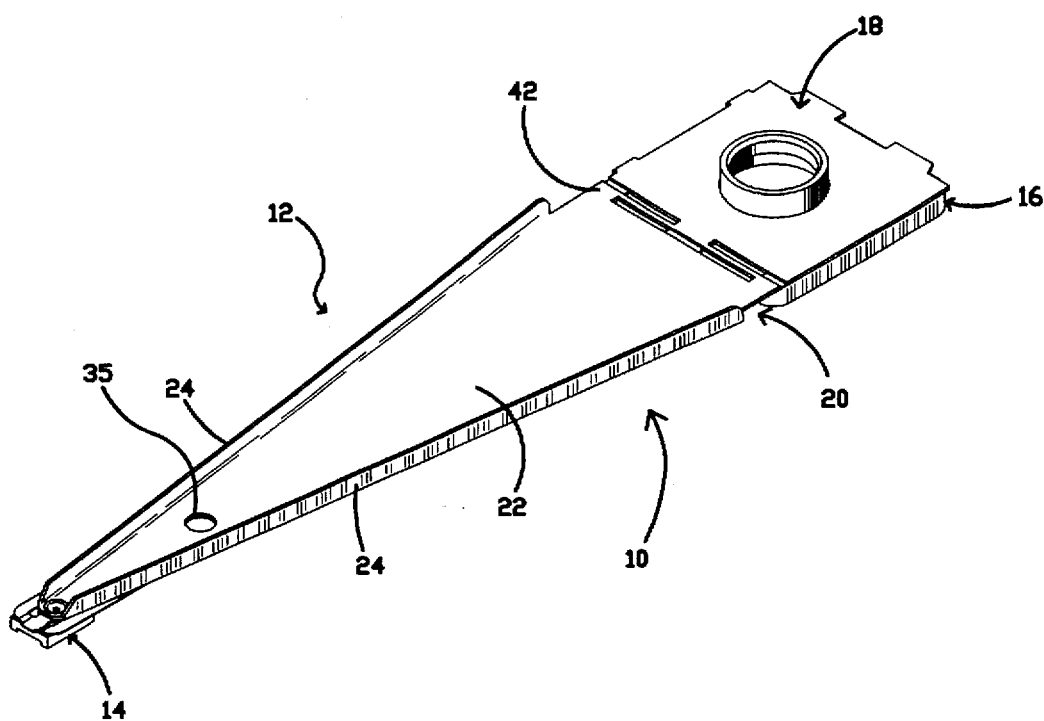
FIG. 1 is an isometric view of a head suspension in accordance with the present invention including two opposing, transverse torsion arms and three partial thickness tabs.
Figure 2:
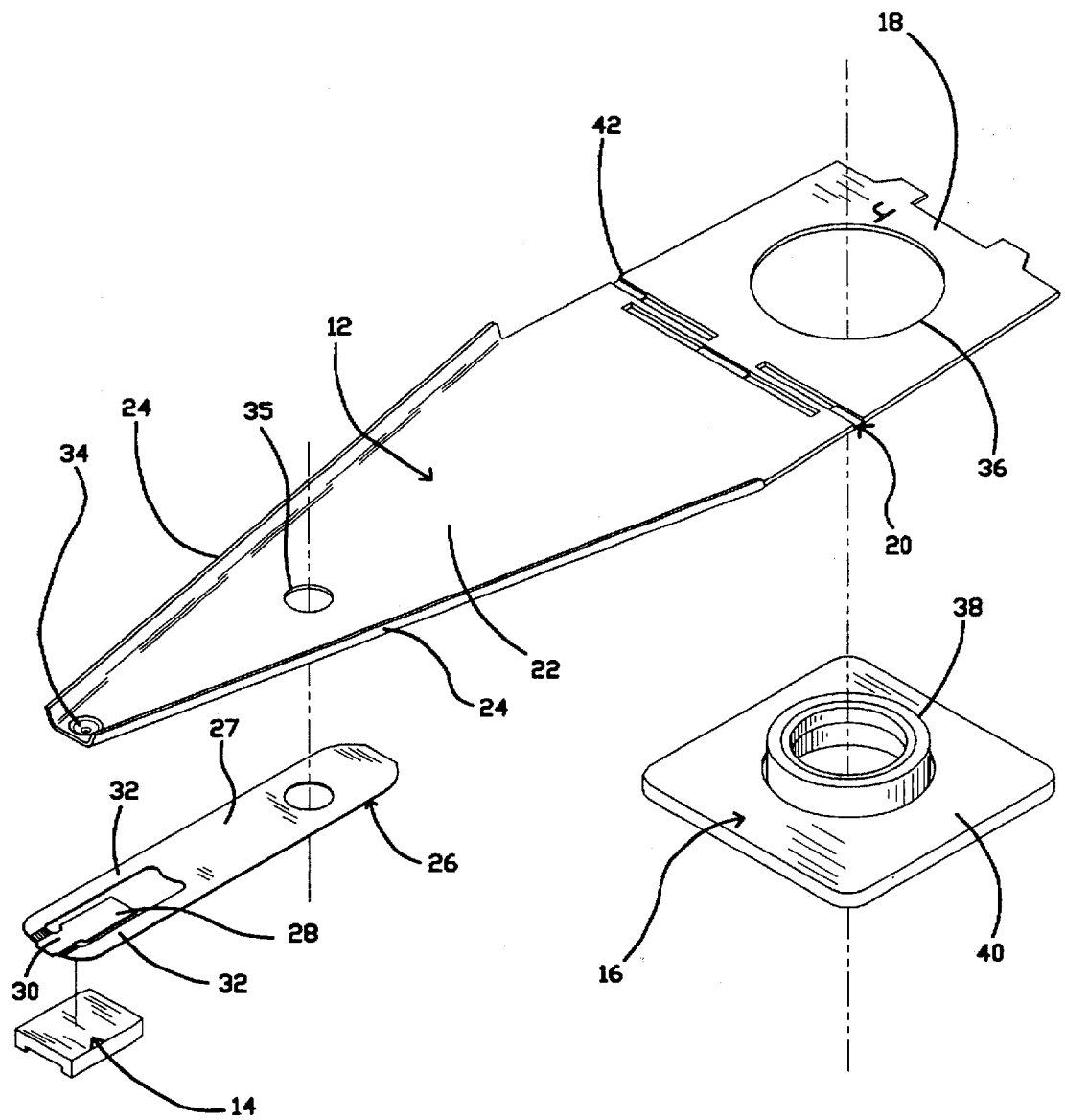
FIG. 2 is an exploded view of the head suspension of FIG. 1 including a load beam, a base plate, a flexure and a head slider for combination with the head suspension.

With reference to the drawings, wherein like components are indicated with like numerals throughout the several Figures, and initially to FIGS. 1 and 2, a head suspension assembly 10 is illustrated which is particularly designed for use within a rigid disk drive assembly or similar dynamic storage device. The head suspension assembly 10 basically comprises a load beam 12 and a base plate 16 to be combined with a conventional head slider 14 having a read/write head (not shown).

The load beam 12 is itself comprised of an actuator mounting region 18 at least a portion of which is used for mounting the load beam to an actuator (not shown), a spring region 20, and a rigid section 22 distal to the actuator mounting region 18. Preferably, the rigid section 22 further comprises stiffening rails 24 which enhance stiffness properties of the rigid section 22 and which are known to be provided in a variety of ways including side rails, such as illustrated, and/or internal rails or channels. The stiffening rails 24 are primarily provided to increase the longitudinal stiffness of the rigid section 22 so as to provide a requisite load or force at the distal tip of the load beam 12 to the head slider 14.

A spring connection is provided between head slider 14 and the load beam 12 at its distal end by a flexure 26 which permits the head slider 14 to move in its pitch and roll directions so that it can compensate for fluctuations of a spinning disk surface. Many different types of flexures, also known as gimbals, are known to provide the spring connection allowing for pitch and roll movement of the head slider 14. Any flexure is contemplated to be used with the present invention. Illustrated is one specific example of a flexure 26 having a head slider bond pad portion 28 to which the upper surface of head slider 14 can be conventionally connected, such as by the use of adhesive or the like. The head slider bond pad portion 28 is conventionally provided from a cross piece 30 which is in turn connected with arms 32 and further connected with a mounting portion 27 of the flexure 26 which is conventionally fixed to the load beam 12, such as by welding. For alignment purposes, the load beam 12 is also provided with a tooling hole 35 that is to be aligned with a similar hole of the mounting portion of the flexure 26 during connection. Also according to this illustrated embodiment, a dimple 34 is provided at the tip of load beam 12 providing a point load from the load beam 12 to the head slider bond pad portion 28 so as to provide the requisite load to the head slider 14 and to permit the pitch and roll movements of head slider 14 and head slider bond portion 28 about the dimple 34.

The actuator mounting region 18 can comprise any number of configurations and provides the functional region of the load beam 12 for connecting the load beam 12 to any conventional actuator assembly (not shown) of a disk drive assembly (not shown), whether the actuator is rotational or linear. According to the illustrated embodiment, the actuator mounting region 18 includes a circular opening 36 which is utilized for connecting the load beam 12 to the base plate 16 to enhance the rigid connection of the load beam 12 with an actuator assembly.

Base plate 16 can be conventionally connected with the actuator mounting region 18, such as by welding, and according to the illustrated embodiment, includes a circular collar 38 which fits within the circular opening 36 of the actuator mounting region 18 and a plate region 40 which is preferably connected to the material of the actuator mounting region 18 for enhancing the rigidity of the actuator mounting region 18.

The spring region 20 is positioned between the actuator mounting region 18 and the rigid section 22. A primary purpose of the spring region 20 is to provide a predetermined load at the flexure 26 connected with load beam 12, and specifically to the head slider 14. The spring region typically includes a radius or bend to provide this load.

Within the spring region 20, and adjacent to actuator mounting region 18 is torsion arm section 42. In the embodiment illustrated in FIG. 3, the torsion arm region 42 includes a single transverse groove 44 positioned midway between the spring region edges 46 and two collinear, transverse grooves 48a, 48b parallel and proximal to groove 44. Collinear transverse grooves 48a, 48b extend out to the spring region edges 46 and form between them an arm 50 in the spring region.

Figure 4:
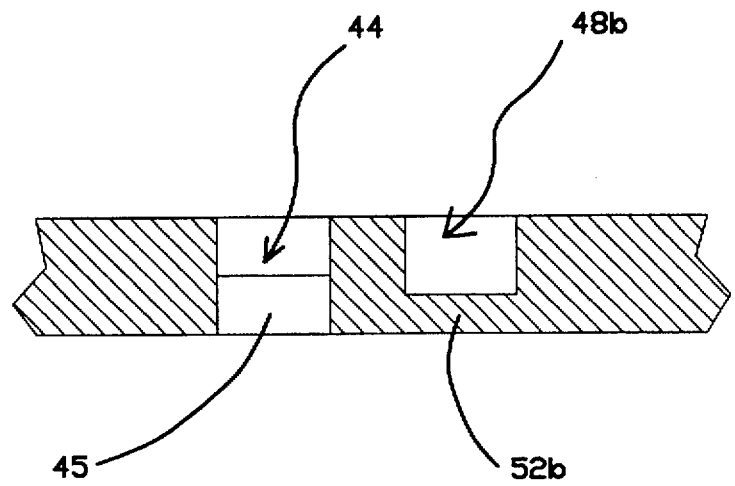
FIG. 4 is a cutaway view of the head suspension of FIG. 1 along line 4—4 showing detail of the torsion arms and partial thickness tabs.
Figure 5:
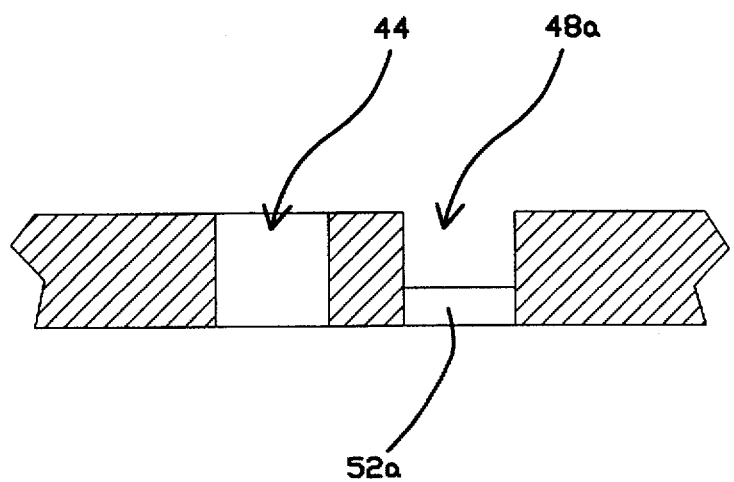
FIG. 5 is a cutaway view of the head suspension of FIG. 1 along line 5—5 showing detail of the torsion arms and partial thickness tabs.

Each collinear transverse groove 48a, 48b has partial thickness tabs 52a and 52b. As can be seen in FIG. 4, these tabs form areas of reduced thickness extending from the spring region edges 46 transversely into the spring region to a point coinciding with the beginning of single transverse groove 44. As can be seen in FIG. 5, from this point to each endpoint of collinear transverse grooves 48a, 48b the transverse grooves 48a, 48b extend entirely through the thickness of the spring region 20.

Figure 3:
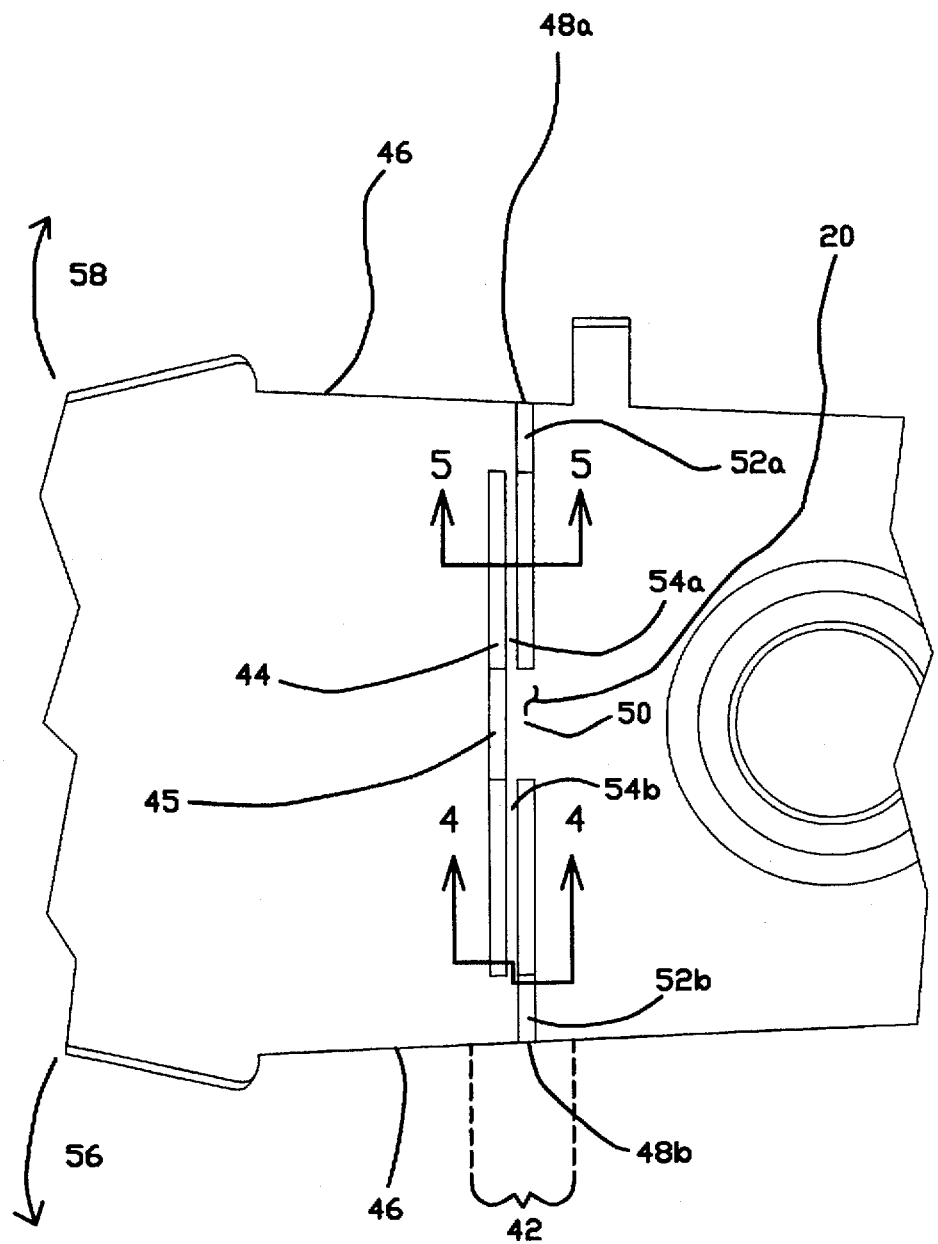
FIG. 3 is an enlarged top view of the head suspension of FIG. 1 showing detail of the torsion arms and partial thickness tabs.

In the preferred embodiment of FIG. 3, single transverse groove 44 has a partial thickness tab 45 at its transverse center. Partial thickness tab 45 extends from a point coinciding with the interior endpoint of groove 48a to a point coinciding with the interior endpoint of groove 48b. The remainder of the length of groove 44 extends on either side of partial thickness tab 45 adjacent to collinear transverse grooves 48a and 48b and extends entirely through the thickness of the spring region 20.

The partial thickness tabs 45, 48a, 48b, can be formed using partial etch techniques that are well known in the art or any other machining method or the like that is known or developed.

The opposed regions extending transversely from the spring region arm 50, between the transverse groove 44 and the collinear transverse grooves 48a, 48b, form torsion arms 54a, 54b. The essence of a torsion arm of the present invention is that it is a thin beam that directly or indirectly connects to the actuator mounting region of head suspension assembly 10 at one point, specifically in FIG. 3, each side of arm 50, and extends in a direction having a transverse component to another point where it directly or indirectly attaches to the flexure 26 of head suspension assembly 10, specifically in FIG. 3, a point adjacent to the endpoints of groove 44.

Figure 6A:
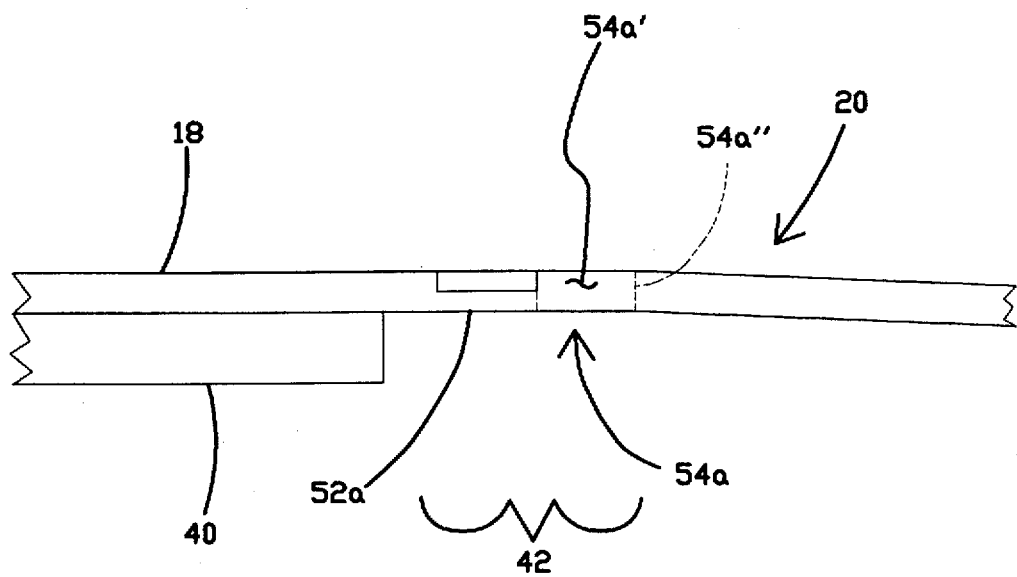
FIG. 6a is a side view of the head suspension of FIG. 1 showing a torsion arm in a rest position in accordance with the present invention.
Figure 6B:
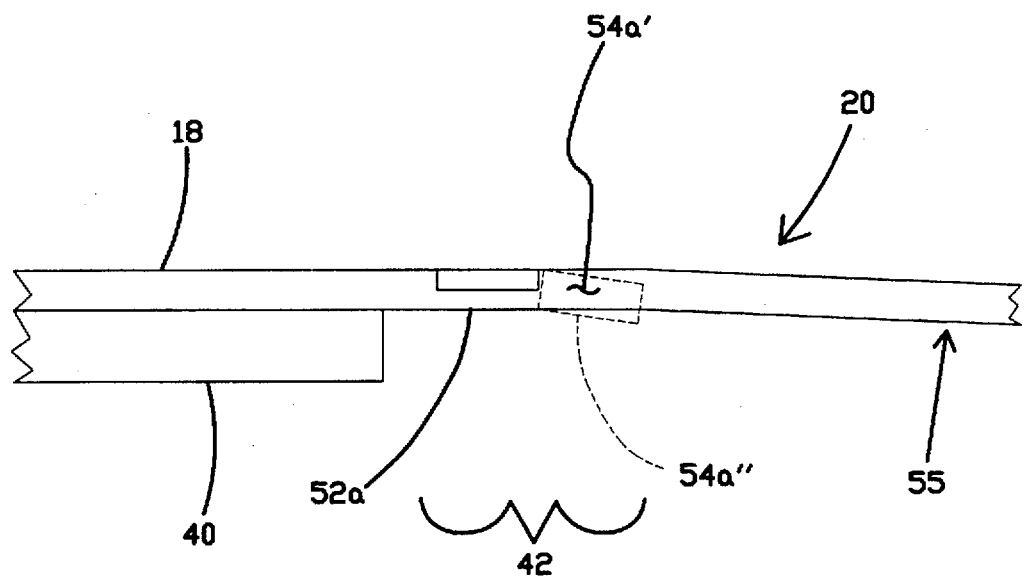
FIG. 6b is a side view of the head suspension of FIG. 1 showing a torsion arm in accordance with the present invention when a force is applied at the head slider.

FIGS. 6a and 6b show the functioning of a torsion arm of the present invention. FIG. 6a shows a side view of torsion arm region 42 of load beam 12 including the end face 54a' of torsion arm 54a as it appears along spring region edge 46 with no force exerted on the head slider 14. The transversely opposed end face 54a" of torsion arm 54a where torsion arm 54a joins arm 50 (shown in phantom) is rotationally aligned with end face 54a'. As approximately shown in FIG. 6b, if a force 55 normal to load beam 12 is exerted on the head slider 14 in a counter-clockwise direction, the end face 54a' of torsion arm 54a rotates counter-clockwise. However, the transversely opposed end face 54a" of torsion arm 54a does not substantially rotate with end face 54a'. Thus, torsion arm 54a is rendered twistedly deformed by the counter-clockwise force 55 acting normal to the load beam 12. This deformation generates a torque opposing the counter-clockwise force 55 that obeys a Hooke's law relation. Torsion arm 54b is a mirror image of torsion arm 54a and displays the same dynamics.

Torsion arms 54a, 54b are more pliable than the remainder of the full thickness surface of the spring region 20. Further, the partial thickness tabs 45, 52a, 52b are less resilient in a normal direction to the spring region than the torsion arms 54a, 54b. Thus, effectively, the twisting action of the torsion arms 54a, 54b is primarily responsible for the load force at the head slider 14. The result is a load beam with a reduced spring rate when compared to load beam without torsion regions. Empirical testing showed the spring rate of a head suspension including a load beam in accordance with the design of FIG. 3 to be approximately 6 N/m and the spring rate of a head suspension including a load beam in accordance with the design of FIG. 7 to be approximately 3 N/m.

An additional advantage of the present invention is that though the load beam displays a lowered spring rate, sway mode resonant frequency is not diminished. In the embodiment of FIG. 3, this is achieved through the use of partial thickness tabs 52a, 52b. Though not thick enough to raise the spring rate of load beam 12, partial thickness tabs 52a, 52b act to retain high lateral stiffness in load beam 12. Partial thickness tabs 52a, 52b have low lateral expansion capacity.

That is, they are not significantly expandable in the plane of load beam 12. Thus, referring to FIG. 3, if a lateral force in the direction of arrow 56 acts on load beam 12, partial thickness tab 52a will not expand to allow lateral compliance of load beam 12. Similarly, if a force acts on load beam 12 in the direction of arrow 58, partial thickness tab 52b will not expand to allow lateral compliance of load beam 12. This results in a load beam 12 of high lateral stiffness and, therefore, high sway mode resonant frequency. Head suspensions including load beams of the present invention in accordance with those shown in FIGS. 3 and 7 have been found to have sway mode resonant frequencies of approximately 12,500 Hz.

It should be noted that the partial thickness tabs 52a, 52b are preferred but not essential to the aspect of lowering spring rates of the present invention.

Figure 7:
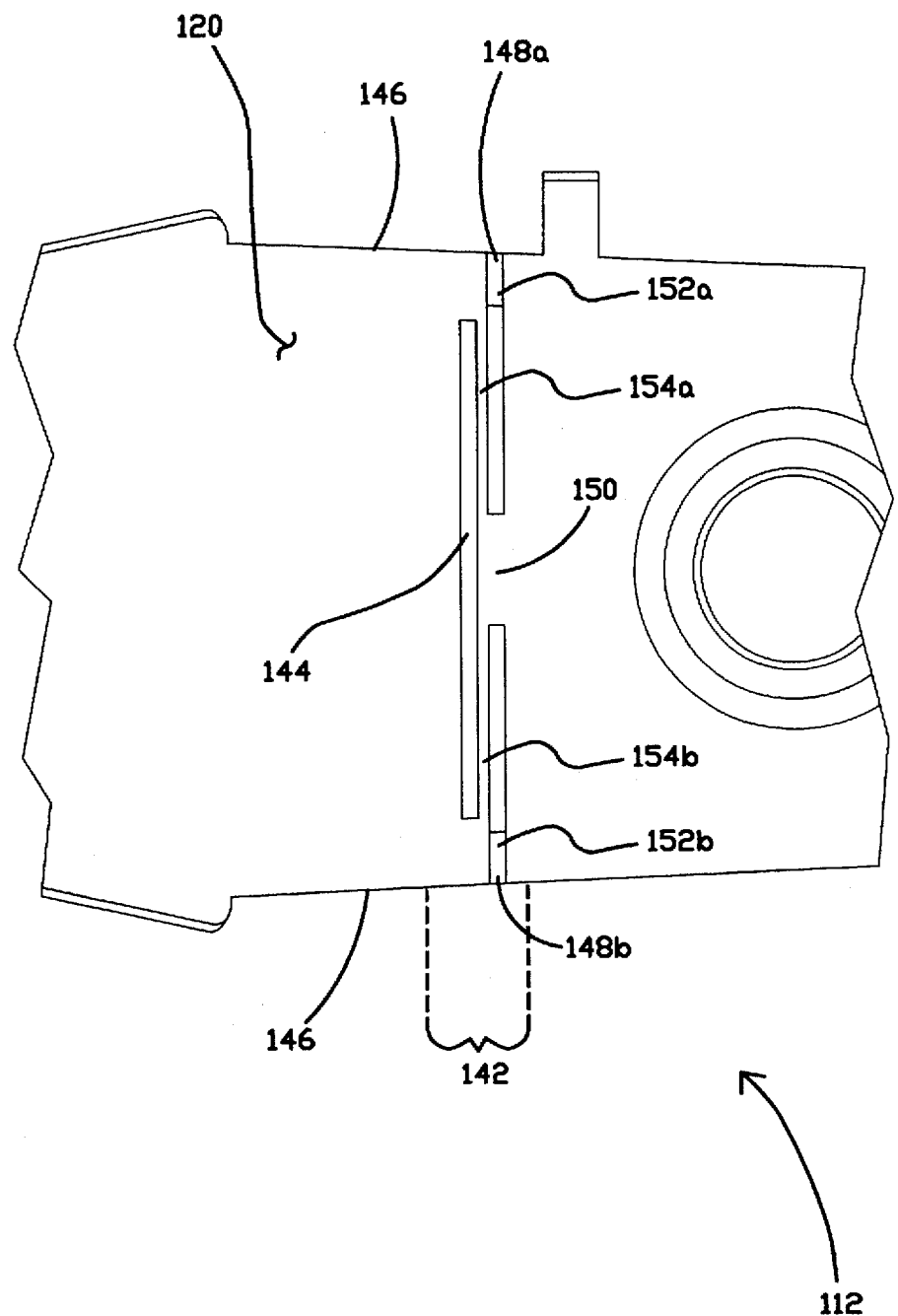
FIG. 7 is an enlarged top view of a head suspension in accordance with the present invention including two opposing, transverse torsion arms and two partial thickness tabs.

The above describes only one embodiment of the current invention, other embodiments using the same design technique are also possible. FIG. 7 shows another possible design. Torsion arm region 142 has three grooves. Single transverse groove 144 is positioned midway between the spring region edges 146 and extends entirely through the thickness of spring region 120. Collinear transverse grooves 148a, 148b extend parallel and proximate to transverse groove 144, start at the spring region edges 146 and do not span the transverse width of spring region 120. Thus, collinear transverse grooves 148a, 148b form between them an arm 150 in spring region 120. Each collinear transverse groove 148a, 148b has partial thickness tabs 152a, 152b which extend from the spring region edges 146 part way into spring region 120. The remainder of collinear transverse grooves 148a, 148b extend through the complete thickness of spring region 120. The opposed regions extending between the transverse groove 144 and the collinear transverse grooves 148a, 148b form torsion arms 154a, 154b. These torsion arms act on the same physical principles as those of FIG. 3.

Unlike the design of FIG. 3, transverse groove 144 has no partial thickness tab. Also, transverse groove 144 does not extend toward the spring region edges 146 to points where the partial thickness tabs 152a, 152b end, but stops slightly to the interior of spring region 120 from those points. The torsion spring arms 154a, 154b function substantially the same as those of FIG. 3.

Still other designs using the same concept are possible. For example, the location of the single transverse groove 44 or 144 could be longitudinally interchanged with the location of the collinear transverse grooves 48a, 48b, or 148a, 148b. This would result in an arrangement in which transverse groove 44 or 144 is proximal to collinear transverse grooves 48a, 48b or 148a, 148b.

Figure 8:
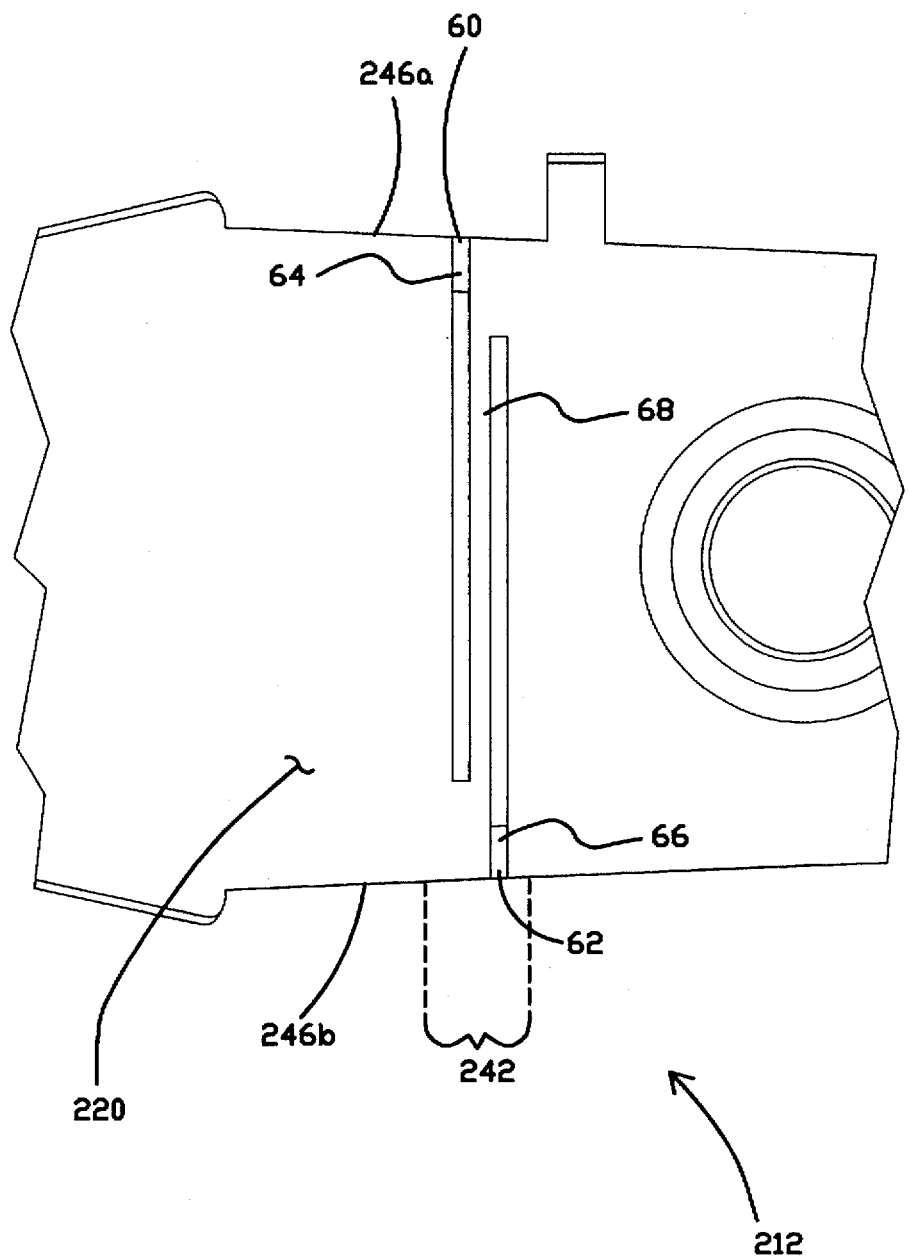
FIG. 8 is an enlarged top view of a head suspension in accordance with the present invention including a single transverse torsion arm and two partial thickness tabs.

Yet another possible design is shown in FIG. 8. In this embodiment, a single torsion arm is formed from two transverse grooves in the torsion arm region. Distal transverse groove 60 extends from spring region edge 246a through the transverse center of the spring region 220 to a point interior of the opposite spring region edge 246b. Proximal transverse groove 62 extends parallel and proximal to distal transverse groove 60 from spring region edge 246b through the transverse center of the spring region to a point interior of spring region edge 246a. Partial thickness tab 64 extends transversely in distal transverse groove 60 from the spring region edge 246a to a point transversely exterior of the endpoint of proximal transverse groove 62. The remainder of distal transverse groove 60 extends through the entire thickness of spring region 220. Similarly, partial thickness tab 66 extends transversely into proximal transverse groove 62 to a point exterior of the endpoint of distal transverse groove 60. The remainder of proximal transverse groove 62 extends in the normal direction though the entire thickness of the spring region 220.

The transverse region between the two transverse grooves 60, 62 forms torsion arm 68. As with above embodiments, twisting motion of torsion arm 68 is primarily responsible for providing the load force at head slider 14. Still another embodiment of the current invention could be realized by interchanging the longitudinal positions of the two transverse grooves 60, 62. In such an embodiment, groove 60 would be proximal to groove 62.

I claim:

1. A head suspension to be connected to an actuator of a rigid disk drive and for supporting a head slider, said head suspension including a load beam that comprises:
   an actuator mounting region for connection to an actuator;
   a rigid region between said actuator mounting region and an end of said load beam distal from said actuator mounting region;
   a flexure at the end of said load beam distal from said actuator mounting region and including a head slider bond pad to which a head slider is to be mounted and to permit flexing of the head slider;
   a spring region between said actuator mounting region and said rigid region; and
   at least one torsion arm connected between a first point and a second point in said spring region, the second point transversely spaced from the first point, the torsion arm further having two free side edge portions extending at least partially between the first point and the second point so that a twisting action of said torsion arm initiated by a deflection of the head slider at the end of said load beam distal from said actuator mounting region imparts a force in the direction opposing the deflection of said load beam.

2. The head suspension of claim 1 including a plurality of partial thickness tabs in said spring region which are substantially rigid in the plane of said load beam such that a force exerted on said load beam in the plane of said load beam is opposed by the rigidity of said partial thickness tabs.

3. The head suspension of claim 2 wherein both said torsion arm and said plurality of partial thickness tabs connect said spring region with said actuator mounting region.

4. The head suspension of claim 3 wherein two said torsion arms extend opposingly from an area substantially in the transverse center of said spring region towards outer side edges of said spring region.

5. The head suspension of claim 4 wherein said two torsion arms and two said partial thickness tabs positioned at the outer edges of said spring region connect said spring region to said actuator mounting region.

6. The head suspension of claim 1 wherein said spring region is directly connected with said actuator mounting region and said torsion arm is provided substantially at an interface of said spring region and said actuator mounting region so as to connect said spring region to said actuator mounting region.

7. The head suspension of claim 1 including at least two transversely extending grooves extending through the entire thickness of the load beam and defining the free side edge portions of the torsion arm.

8. A head suspension to be connected to an actuator of a rigid disk drive and for supporting a head slider, said head suspension including a load beam that comprises:

an actuator mounting region for connection to an actuator;

a rigid region between said actuator mounting region and an end of said load beam distal from said actuator mounting region;

a flexure at the end of said load beam distal from said actuator mounting region and including a head slider bond pad to which a head slider is to be mounted and to permit flexing of the head slider;

a spring region between said rigid region and said actuator mounting region;

a plurality of partial thickness tabs in said spring region which are substantially rigid in the plane of said load beam such that a force exerted on said load beam in the plane of said load beam is opposed by the rigidity of said partial thickness tabs;

at least one torsion arm connected between a first point and a second point in said spring region, the second point transversely spaced from the first point, the torsion arm further having two free side edge portions extending at least partially between the first point and the second point such that a twisting action of said torsion arm initiated by a deflection of the head slider at the end of said load beam distal from said actuator mounting region imparts a force in the direction opposing the deflection of said load beam.

9. The head suspension of claim 8 wherein said spring region is connected directly to said actuator mounting region and said torsion arm and said partial thickness tabs are positioned at an interface between said spring region and said actuator mounting region.

10. The head suspension of claim 8 wherein said torsion arm and said plurality of partial thickness tabs connect said spring region to said actuator mounting region.

11. The head suspension of claim 10 wherein two said torsion arms extend opposingly from an area substantially in the transverse center of said spring region towards outer side edges of said spring region.

12. The head suspension of claim 10 wherein two said torsion arms extend opposingly from an area substantially in the transverse center of said spring region towards outer side edges of said spring region and further wherein two said partial thickness tabs are positioned at the outer side edges of said spring region.

13. A head suspension to be connected to an actuator of a rigid disk drive and for supporting a magnetic head, said head suspension including a load beam that comprises:

an actuator mounting region for connection to an actuator;

a rigid region between said actuator mounting region and an end of said load beam distal from said actuator mounting region;

a flexure at the end of said load beam distal from said actuator mounting region and including a head slider bond pad to which a head slider is to be mounted and to permit flexing of the head slider;

a spring region between said actuator mounting region and said rigid region;

two partial thickness tabs positioned adjacent to outer side edges of said spring region and which are substantially rigid in the plane of said load beam; and two transverse torsion arms each connected between a first point and a second point in said spring region, said transverse torsion arms opposedly extending from an area substantially in the transverse center of said spring region, said two torsion arms and said two partial thickness tabs coupling said spring region to said actuator mounting region such that twisting action of said two torsion arms initiated by a deflection of the head slider at the end of said load beam distal from said actuator mounting region imparts a force in a direction opposing the deflection of said load beam and further such that a force exerted on said load beam in the plane of said load beam is opposed by the rigidity of said partial thickness tabs.

* * * * *